United States Patent [19]

Shen

[11] Patent Number: 5,073,615
[45] Date of Patent: Dec. 17, 1991

[54] HIGH TEMPERATURE HEAT RESISTANT ACRYLICS

[75] Inventor: Jyi-Sheng J. Shen, San Dimas, Calif.

[73] Assignee: Continental Polymers, Inc., Compton, Calif.

[21] Appl. No.: 322,615

[22] Filed: Mar. 13, 1989

[51] Int. Cl.$^5$ .......................................... C08F 222/40
[52] U.S. Cl. ................................................ 526/262
[58] Field of Search ........................................ 526/262

[56] References Cited

FOREIGN PATENT DOCUMENTS 109811 7/1987 Japan.
223208 10/1987 Japan.

Primary Examiner—Joseph L. Schofer
Assistant Examiner—Alex H. Walker
Attorney, Agent, or Firm—Morgan, Lewis & Bockius

[57] ABSTRACT

A high temperature heat resistant methacrylate-maleimide copolymer having at least 90% by weight methyl methacrylate monomer and up to about 10% by weight maleimide monomer to form a clear, weather-resistant copolymer having glass transition temperatures from about 105° C. to about 131° C. and a method of manufacture of the copolymers through an extremely high conversion bulk polymerization process.

3 Claims, 1 Drawing Sheet

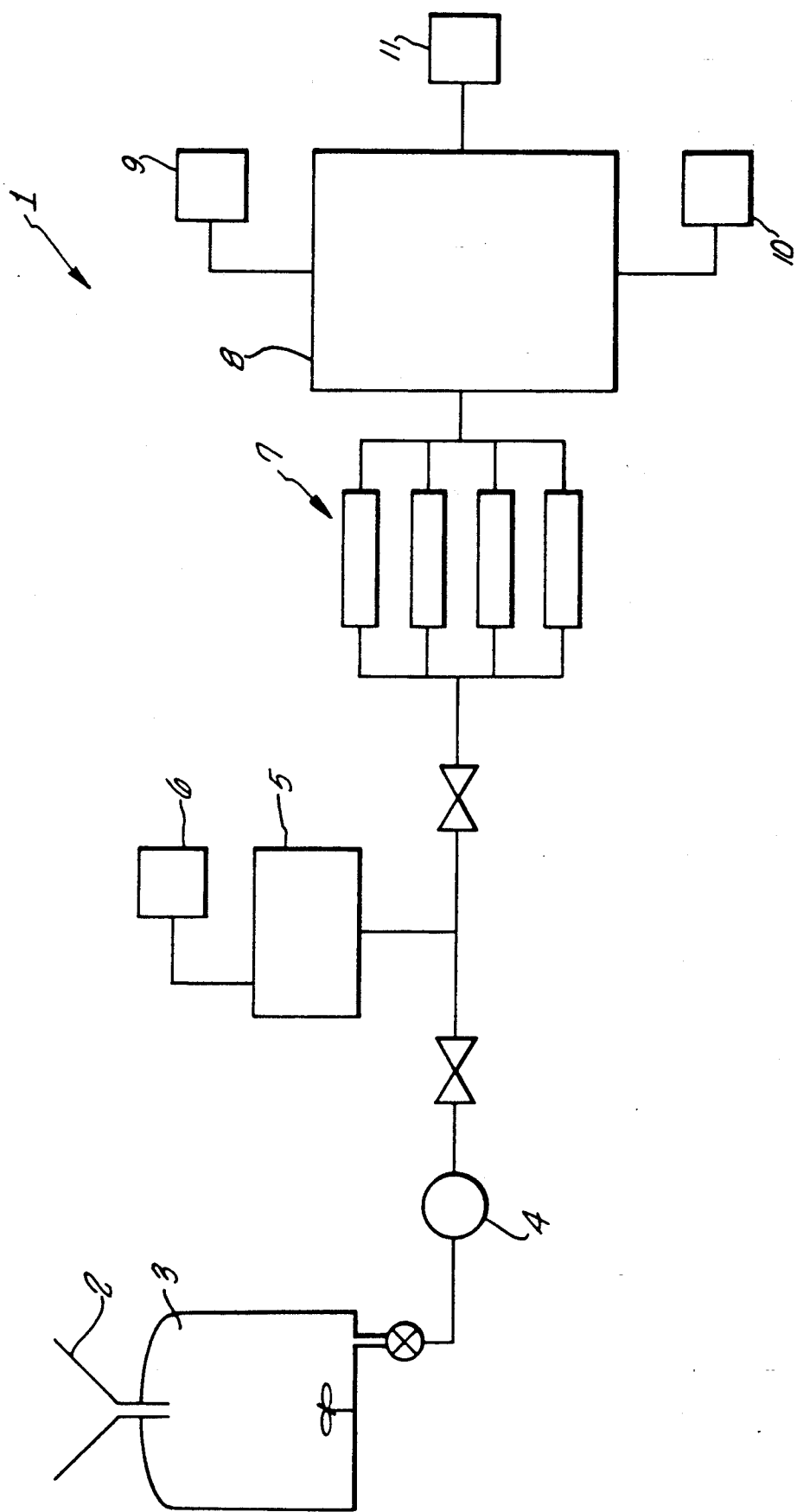

HIGH TEMPERATURE HEAT RESISTANT ACRYLICS

BACKGROUND

Field of the Invention and Description of Related Art

The present invention relates to high temperature heat resistant acrylic polymers preferably made through free radical polymerization of methyl methacrylate (MMA) and related acrylates with maleimide (MI) and related maleimides through an extremely high conversion bulk polymerization process to produce extremely pure, improved acrylic copolymers.

The acrylic copolymers of the present invention have approximately the same physical properties as conventional acrylic polymers except that the present invention polymers have high purity, a higher glass transition temperature, better impact resistance higher heat distortion temperatures, and in the case of preferred polymers, excellent clarity.

In general, acrylics are well known and have excellent optical properties and weatherability for numerous uses such as in lighting fixtures, automobile tail light lenses, dials, video discs, opthalmic contact lenses and numerous other articles where durable, weatherable, clear features are desired.

In order to obtain specific optimized physical properties for acrylics, it has been known to polymerize different monomers to form copolymers. The art of copolyermization had an early start in polymer technology since it was found that copolymerization of a mixture of two or more monomers lead to polymers which had different and/or more suitable physical properties than either of the homopolymers alone or a mechanical blend of polymers formed from the individual monomers.

Poly (methyl methacrylate) (PMMA) is the most popular commercial polymer in the acrylic industry at present. The relatively high clarity and excellent light transmission of PMMA, i.e., transparency, coupled with its resistance to sunlight and low density make this polymer ideally suited to production of automobile tail light lenses, dial covers, lighting fixtures and other related articles. PMMA has excellent weather resistance, durability and is pleasing in appearance when formulated into relatively thick sections and these features render PMMA and related acrylics ideal for such end uses.

In the context of the present invention the term transparent refers to the property of the copolymers of the present invention to be transparent to light and specifically refers to the fact that the preferred copolymers of the present invention have transparency properties about the same as the transparency properties of conventional PMMA.

The heat distortion temperature (HDT) of PMMA copolymers are satisfactory for most uses for relatively short times at temperatures of 90°-102° C. (195°-295° F.). The glass transition temperature (Tg) of PMMA copolymers are generally between 85°-105° C. However, for relatively long time periods and/or for lighting systems in which relatively great amounts of heat are produced by the lamps, such as, for example, in mercury vapor lighting systems, the glass transition temperatures and heat distortion temperatures of conventional PMMA copolymers are unsatisfactorily low.

SUMMARY OF THE INVENTION

The above-stated need for a high temperature acrylic has been satisfied by the present invention which encompasses a copolymer using methacrylate and maleimide group monomers. The acrylic copolymers of the present invention are manufactured in a specially designed bulk polymerization process having extremely high conversion rates for the methacrylate and maleimide group monomers. The final methacrylate-maleimide group copolymers are transparent without phase separation and have superior heat resistance properties compared to commercial PMMA based on HDT and Tg data. The MMA/MI copolymers of the present invention can be made in a wide range of molecular weights and with a wide range of acrylate group monomers and a wide range of maleimide group monomers.

The term phase separation refers to a phenomenon found, especially, in extremely high conversion copolymerization processes, that is, where the conversion rate is about 98% or above. One of the unusual features of the preferred copolymers of the present invention is their ability to avoid phase separation at such extremely high conversion rates. The term phase separation refers to the cloudy appearance of a copolymer, currently believed to be caused by light scattering due to the different refractive indices of the monomers used in the polymer mixture and the domain size phenomenon as described in J. Shen, Ph.D dissertation entitled "Microphase Separation in Copolymers from High Conversion Free Radical Polymerization", the University of Akron, Ohio 44325 (1988).

Methacrylate group monomers (group I), such as methyl methacrylate; ethyl methacrylate, maleimide group monomers (group II), such as maleimide, N-methylmaleimide, N-ethylmaleimide, N-phenylmaleimide and N-cyclohexylmaleimide; and acrylate group monomers (group III), such as ethyl acrylate, butyl acrylate and propyl acrylate, can be mixed as I, II, III or I, II, or II, III mixtures, to provide copolymers with two or three or more different constituent monomers. In the bulk polymerization of the present invention, two types of initiators are used. The first initiator is a low temperature initiator having a half life of approximately 10 hours in the temperature range of 50°-70° C. and the second initiator is a high temperature initiator having a half life of approximately 10 hours at temperatures between 90°-130° C.

The low temperature initiators can be, for example, lauroyl peroxide, benzoyl peroxide, decanoyl peroxide, isononanoyl peroxide, and propionyl peroxide as well as others known to be equivalent to those of ordinary skill in the acrylic polymer art. The second, or high temperature, initiator can be, for example, 2,5-dimethyl-2,5-di(t-butylperoxy) hexane, t-butylperoxy isopropyl carbonate, t-butyl peracetate, t-butyl perbenzoate and dicumyl peroxide as well as others known to be equivalent by those of ordinary skill in the acrylic polymer art.

Also, mercaptans are used in the present process for controlling the chain lengths, that is, the molecular weights, of the copolymer. Mercaptans such as n-dodecyl mercaptan, n-butyl mercaptan, t-butyl mercaptan and others known in this art may be used in the bulk polymerization process of the present invention.

Additives such as internal lubricants, external lubricants, UV-absorbers, processing aids, antioxidants, dyes, thermal stabilizers and others additives known to those of ordinary skill in the acrylic polymer art may be added to the process ingredient mixture depending on the need and physical properties desired with respect to the end use of the particular copolymer.

Preparation of the finished polymer involves thoroughly mixing the chosen monomers, initiators, mercaptans and additives desired. The mixing is conducted in a stainless steel container or tank and mixing continues to insure that all ingredients are thoroughly dissolved. The mixture is then purged with nitrogen gas for 20-30 minutes prior to filtration through a 0.2 micron nylon 66 or Teflon TM filter. A 20+ psi vacuum is then applied to the mixture for approximately 20 to 30 minutes to purge remaining gases and then the mixture is transferred to a nylon 66 or nylon 6 polymer cell for polymerization. The cell is similar in appearance to a large plastic trash bag and its dimensions are dependent upon the amount of mixture intended to be placed in the bag for polymerization. The copolymer cell or bag dimensions are chosen to insure uniform temperature distribution within the block or mix during the baking or polymerization step of the manufacturing process. For example, a typical thickness of the nylon bag film or wall is about 1-3 mils for a bag thickness of no more than 1¼ inches, although other dimensions may be used in specific processes. The bag dimension and wall thickness of the bag are chosen to and function to provide relatively high surface area on the bag peripheries to maximize removal of the exothermic heat of reaction and thus maintain a low temperature drop between the monomer mixture filled bag and the oven temperature during, especially, those periods when the polymerization reaction is taking place at its fastest rate.

The bulk polymerization process of the present invention uses a constant temperature reaction chamber, wherein at the beginning of the process heat is added to initiate the reaction, and later during the polymerization reaction heat is removed to prevent bubble formation in the reacting mixture, and later additional heat is added to force the reaction to extremely high conversion rates.

Typically, the temperatures within the reaction chamber is controlled by supplying heat to the chamber at various times during the polymerization process, and supplying cooling to the chamber at other times during the polymerization process. Also, the time-temperature profile for a given polymerization process is controlled through a microprocessor system. Initially heat is supplied to the reaction chamber to help initiate the polymerization reaction. As the polymerization reaction proceeds excess heat is produced during various stages of the polymerization reaction. In those excess heat production stages the reaction chamber heaters are de-energized and the reaction chamber cooling system is energized to blow cool air over the mixture containing cells to control the temperatures to within about 0.5° C. of the desired temperature. It has been found that a typical time-temperature program for polymerizing copolymers of the present invention within the reaction chamber is as follows:

| Step | Temperature | Time |
|---|---|---|
| 1 | 63° C. | 8 hours |
| 2 | 55° C. | 3 hours |
| 3 | 75° C. | 2 hours |
| 4 | 115° C. | 4 hours |
| 5 | 135° C. | 6 hours |

In such a typical polymerization process, during the first 8 hours the addition of heat to the reaction chamber is required and during the second step removal of heat from the reaction chamber is required. During the last three steps the addition of heat to the reaction chamber is also required. This later heat addition functions to push the reaction to high, and in the case of the fifth step, to push the reaction to extremely high conversion. Although the time-temperature profile of the polymerization reaction may be modified for a given mixture, the time-temperature perimeters should be adjusted so that the polymerization takes place at a rate not so fast that bubbles, hot spots or distortions are formed in the polymerizing mixture, and so that in later stages of the polymerization sufficient heat is added to the mixture to achieve extremely high conversion, that is, conversion in excess of 98%.

The final, bulk polymers produced have a very smooth appearance and no irregular, or "hot spot" surfaces. They also exhibit glass transition temperatures of approximately 105° C. to 131° C. with increasing fraction of MI content. These are superior glass transition temperatures compared to glass transition temperatures of approximately 85°-105° C. for conventional PMMA copolymers.

The final copolymers of the present invention generally comprise 90% or more of MMA fraction and up to about 10% MI fraction of the monomer mixture in the copolymer.

The low value of maleimide composition in copolymers of the present invention is based on the fact that approximately 11% by weight maleimide may be dissolved in methyl methacrylate at room temperatures. Should mixing take place at higher temperatures, the relative proportions of methacrylate and maleimide monomers can be adjusted. The value of MI composition is a function of solubility of the particular maleimide chosen in the particular methacrylate or acrylate chosen.

BRIEF DESCRIPTION OF THE DRAWINGS

FIG. 1 is a block diagram of the bulk polymerization process of the present invention

DESCRIPTION OF PREFERRED EMBODIMENTS

By reference to FIG. 1 and the figures in the tables discussed herein preferred embodiments of the present invention will be described.

The starting materials for the copolymers of the present invention include monomers, high and low temperature initators, chain transfer agents, and optional additives such as lubricants, UV-absorbers, etc.

The acrylic copolymers of the present invention include two or three monomer component acrylic polymers. The first monomer typically is a methacrylate monomer such as methyl methacrylate or ethyl methacrylate. The second monomer is a maleimide monomer such as maleimide, N-methylmaleimide, N-ethylmaleimide, N-phenyl-maleimide or N-cyclohexylmaleimide. The third monomer is an acrylic monomer, such as ethyl acrylate, butyl acrylate or propyl acrylate.

The first, second and third monomers may be mixed in combinations of either first, second and third, or first and second, or second and third to form the basic monomer mixture. This mixture is used in preparing a specific acrylic polymer of the present invention.

The preferred maleimides of the present invention are set forth, together with their structural formula, below:

1. Maleimide

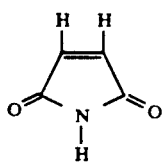

2. N-methylmaleimide

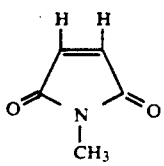

3. N-ethylmalemide

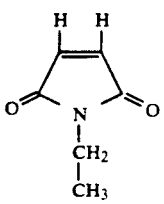

4. N-phenylmaleimide

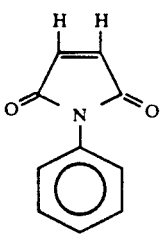

5. N-cyclohexylmaleimide

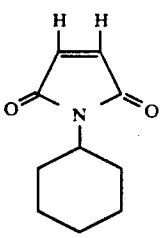

The preferred methacrylate of the present invention is methyl methacrylate, whose structural formula is shown below:

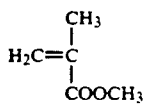

Conventional poly (methyl methacrylate) (PMMA) is also shown below:

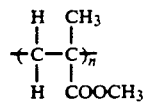

Two types of initiators are also used in the polymerization process of the present invention. The first initiator is a low temperature initiator having a half life of about 10 hours at temperatures between 50°-70° C./ and the second initiator is a high temperature initiator having a half life of 10 hours between temperatures of 90°-130° C. The low temperature initiator may be, for example, lauroyl peroxide, benzoyl peroxide, decanoyl peroxide, isononanoyl peroxide, propionyl peroxide or other low temperature initiators known in the acrylic polymer arts. The high temperature initiator may be, for example, 2,5-dimethyl-2,5 di(t-butylperoxy) hexane, t-butylperoxy isopropyl carbonate, t-butyl peracetate, t-butyl perbenzoate, dicumyl peroxide and other high temperature initiators known in the acrylic polymer arts.

In order to control the chain length or the molecular weights of the specific polymer, chain length controlling additives must be used. Preferably mercaptans, such as n-dodecyl mercaptan, n-butyl mercaptan, t-butyl mercaptan and others known to be equivalent to those in the acrylic polymer art may be used.

Finally, other additives, well known in the acrylic polymer arts, such as internal lubricants, external lubricants, UV-absorbers, processing aids, antioxidants, dyes, thermal stabilizers and so forth may be added to the ingredient mixture depending on the properties desired for the final acrylic polymer.

Referring to the FIG. 1 block diagram, the bulk polymerization process of the present invention will be described. The physical components of the bulk polymerization process shown in FIG. 1 are all conventional components and are presently used to make conventional PMMA copolymers. The system, however, will be described herein to aid in understanding the process and copolymers of the present invention.

The bulk polymerization system 1 has a feed funnel 2 for introduction of the raw material mixture including the monomers, initiators, chain transfer agents, and additives. The mixture is fed through funnel 2 to a conventional compounding tank 3 where the ingredients are thoroughly mixed. The mixed ingredients are then passed through a 0.2 micron filter 4 which is made of, preferably nylon 66 or Teflon TM to remove essentially all undissolved impurities having a diameter greater than 0.2 microns. The preferred filter is sold under the tradename ULTIPOR $N_{66}$ by Pall Puerto Rico, Inc., Fajardo, Puerto Rico, USA 00648. The filtered raw material mixture is then fed to a vacuum tank 5. Vacuum pump 6 draws a vacuum on the tank 5 for approximately 20-30 minutes to establish and maintain a vacuum of 20+ psi to draw off oxygen, air and other gaseous impurities that may be found in the mixture. After vacuum treatment the mixture is then placed in a plurality of bags 7, also known as cells 7. The cells or bags 7 are preferably made of nylon 66 film and are selected in size of the cell and thickness of the cell wall or film so as to provide relatively high surface area for the mixture contained within the bag and to provide a clean container in which the polymerization reaction takes place. Preferably the thickness of the filled bag should be less than 1¼ inches after a particular bag has been filled with mixture from the tank 5. The thickness of the nylon 66 cell wall is preferably 1-3 mils in thickness. The plurality of bags are then placed on racks or trays and placed into a large reaction chamber 8, which at various times functions as either an oven, or as a cooling chamber and in which a batch of mixture filled bags 7 is polymerized. The dimensions of the bags 7, the racks in which the bags are held, and the reaction chamber 8 have been designed to provide relatively high surface area of the bags. The bags 7 are exposed to the ambient temperature within the reaction chamber 8 and the temperatures of the polymerizing mixture within each bag are kept very near to the ambient temperature within the reaction chamber 8 during either heating or cooling. The reaction chamber 8 is provided with a conventional heating system 9, a conventional cooling system 10, and a conventional temperature control system 11 for establishing and maintaining a desired temperature at desired times within the reaction chamber 8. The temperature control system 11 is a conventional microprocessor control system which maintains a deviation of + or $-0.5°$ C. from a programmed temperature.

During polymerization of the mixture within the reaction chamber 8, various temperature-time conditions will provide usable, preferable, or optimum high temperature heat resistant acrylic polymers of the present invention. Below are listed in Table I, Table II and Table III the usable, preferred and optimum time-temperature conditions for the acrylic polymers of the present invention.

TABLE I

| | Usable Time-Temperature Conditions | |
|---|---|---|
| Step | Temperature | Time |
| 1 | 55–70° C. | 5–10 hours |
| 2 | 40–55° C. | 5–10 hours |
| 3 | 70–85° C. | 5–10 hours |
| 4 | 100–120° C. | Greater than 3 hours |
| 5 | 120–250° C. | Greater than 3 hours |

TABLE II

| | Preferrable Time-Temperature Conditions | |
|---|---|---|
| Step | Temperature | Time |
| 1 | 63° ± 2° C. | 8 ± 2 hours |
| 2 | 55° ± 5° C. | 3 ± 2 hours |
| 3 | 75° ± 5° C. | About 1–3 hours |
| 4 | 115° ± 5° C. | 4 ± 1 hour |
| 5 | 135° ± 15° C. | 6 ± 1 hour |

TABLE III

| | Optimum Time-Temperature Conditions | |
|---|---|---|
| Step | Temperature | Time |
| 1 | 63° C. | 8 hours |
| 2 | 55° C. | 3 hours |
| 3 | 75° C. | 2 hours |
| 4 | 115° C. | 4 hours |
| 5 | 135° C. | 6 hours |

In regard to the above Tables I–III, when the mixture filled cells 7 are placed into the reaction chamber 8, heat is added through heating system 9 to help initiate the polymerization reaction. Adding heat usually takes place during the first step in order to maintain the temperature within the ranges set forth in Tables I–III. Typically, the polymerization process is proceeding fairly quickly and exothermically by the time step 2 is reached and during step 2 the heating system 9 is de-energized and the cooling system 10 is automatically energized to establish and maintain the temperatures as set forth in the Tables for the time periods set forth in step 2. During steps 3–5, typically, heat is added to the reaction chamber 8 to push the polymerization reaction to high conversion. For example, typically, step 3 requires the addition of heat to maintain the polymerizing mixture in the bags at the desired temperatures for the desired times as set forth in Tables I–III. Also, in step 4, additional heat is required to push the polymerization to a high conversion and, regarding step 5, even more additional heat is added to push the polymerization reaction to extremely high conversion.

In the above-described reaction, it has been found that at least 5 steps for the time-temperature profile of the reaction is needed to prevent boiling, i.e., bubbling or formation hot spots in the mixture during polymerization. Generally, more steps in the reaction are advantageous in terms of minimizing or eliminating bubble formation in the polymerizing mixture. However, it is also desired to have the minimum number of steps in order to conduct the reaction more quickly and simply. For a typical 5-step process used to make copolymers of the present invention, the desired goal of avoidance of bubble formation is achieved.

In accordance with the principles of the present invention, a number of samples of copolymers of the present invention were prepared in accordance with the bulk polymerization process described above. In Examples 1–5, various proportions of methyl methaorylate and maleimide were used as the group I and II monomers in the copolymer ingredient mix. In all cases in Examples 1–5, lauroyl peroxide was used as the low temperature initiator, 2,5-dimethyl-2,5-di(t-butyl-peroxy) hexane was used as the high temperature initiator to aid in driving the polymerization to a high percentage of conversion and n-dodecyl mercaptan was used as a chain transfer agent. In Table IV, set forth below, specific weights in grams and identities of the ingredients are set forth for Examples 1–5.

TABLE IV

| Example No. | MMA | MI | Low Temp. Initiator | High Temp. Initiator | Chain Regulator |
|---|---|---|---|---|---|
| 1 | 490 | 10 | 0.3 | 0.1636 | 1.6558 |
| 2 | 480 | 20 | 0.3 | 0.1636 | 1.6558 |
| 3 | 470 | 30 | 0.3 | 0.1636 | 1.6558 |
| 4 | 460 | 40 | 0.3 | 0.1636 | 1.6558 |
| 5 | 450 | 50 | 0.3 | 0.1636 | 1.6558 |

The Table IV weights are the weights of the starting materials and all weights are in grams.

As shown in Table IV, both a secondary initiator, that is a high temperature initiator with a 10 hours half life at greater than 100° C. and a mercaptan are used in the polymerization. The purpose of adding the second initiator to the system is to drive the reaction to an extremely high conversion during the bulk polymerization.

Extremely high conversion percentage refers to the polymerization of the present invention which over 98% of the monomer ingredients are converted to copolymer. In most conventional polymerization processes the conversion rates are not as high because conventional processes usually have undesirable side reactions occurring and these reactions cause branching at high conversion. Through the use of chain transfer agents, such as mercaptans, the bulk polymerization process of the present invention controls the branching and chain length so that extremely high conversion rates are facilitated. One of the advantages of the bulk polymerization, high conversion polymerization of the present invention is that extremely clear and clean copolymers may thereby be produced. In many conventional acrylic polymer processes the conversion is only up to about 50%, with the process then requiring unreacted monomer to be removed from the polymerization mixture and returned to a reactor, with attendant contamination resulting during the separation process. In the high conversion, bulk polymerization process of the present invention, separation of unreacted monomer is avoided and the attendant contamination related thereto is thus also avoided.

Within the field of the present invention, contamination usually refers to particulate matter contained within the copolymer mixture and in this context refers both to the size of the particles contained as well as the number of particles. As discussed above, conventional polymerization processes often produce relatively contaminated copolymers due to the transferring of unreacted monomer back into a reaction vessel for further polymerization whereas the bulk polymerization process of the present invention avoids such a transfer. Additionally, the bulk polymerization process of the present invention employs a 0.2 micron filter to thus remove any particulate matter having a diameter equal to or greater than 0.2 microns and produce finished polymers free of larger particles. Also, the bulk polymerization process of the present invention, as shown in FIG. 1, avoids prolonged contact with air and the attendant particulate impurities contained therein, through use of closed systems, vacuum purges, and the aforementioned filter.

It has been discovered that if the polymerization is carried out isothermally at approximately 60° C., the residual monomer content in the polymer bulk cake is more than 20%, even after 15 hours of reaction. Experimental data indicate that after some conversion in the isothermal condition, it is difficult to advance the reaction to completion because of the high viscosity of the copolymer system, which high viscosity inhibits the mobility of the unreacted monomers and polymer chain radicals. This phenomenon is usually explained by invoking a three-step process model for free radical bulk polymerization. At first, the conversion, or propagation increases according to first-order kinetics, but then later the polymerization accelerates due to the slow diffusion of chain radicals. This secondary phenomenon is known as the Tromsdorff effect. In other words, propagation increases but termination decreases when conversion rate reaches approximately 80%. Thirdly, at even higher rates of conversion, i.e., extremely high conversion rates, that is, above 95%, there is a slowing down of the polymerization rate caused by the relatively low concentration of monomers and a corresponding low diffusion rate of chain radicals that reduces the rate of propagation. In order to increase the polymerization rate to achieve extremely high conversion, i.e., greater than 95%, heat is supplied to the bulk mixture in a predetermined time and temperature sequence. The time-temperature sequence is chosen so that viscosity is decreased, or maintained relatively low but not so low as to induce formation of bubbles in the bulk mixture. In a step-by-step increase of reaction temperature during this latter stage of polymerization, the slowing of the rate of propagation due to increase polymerization will be partially balanced by the increasing temperature, but not to the extent existing in the pre-Tromsdorff condition. Also, by increasing the reaction temperature and adding a secondary initiator, however, the conversion can be pushed to an extremely high conversion of greater than 80%. In the optimum polymerization process of the present invention, the reaction is finished after 6 hours at 135° C. in the fifth stage of polymerization. During this stage, that is, during the 6 hours at 135° C., the residual monomers reach a minimum value of approximately 1%. Both the secondary initiator and the programmed time-temperature sequence promote the mobility of the unreacted monomer and chain radicals so that it is copolymerized even in a high viscosity environment.

The major purpose of adding the chain transfer agent in the bulk polymerization system is to shorten the chain length of all of the macromolecules and to provide for a reasonably narrow molecular weight distribution (MWD). Also, because radicals with smaller chain lengths are not apt to become heavily entangled with neighboring molecules, the mobility of the shorter radicals will not change as much as those of the longer radicals. This relatively decreased mobility enhances uniformity of polymerization and is thus desireable in the present invention. It has been discovered that the addition of mercaptan(s) or amines, organic sulfur compounds such as carbon disulfide, carbon tetrachloride and other known chain transfer agents may be used. Mercaptans, however, are preferred.

The copolymers of the present invention may be characterized in terms of residual monomer measurement, molecular weights, polydispersity, monomer composition, and glass transition temperature.

1. Residual Monomer

The residual monomer present in the copolymers of the present invention, Examples 1–5, were determined by a gas chromatography (GC) method. The purpose of the determination of residual monomers was to make sure that all of the polymers from the extremely high conversion polymerization reaction were essentially free of monomer. A modified GC injector was built and used to determine the residual monomer content. The GC injector is a conventional injector modified to include glass wool placed inside of the injector liner as described in ["reference A"]. The glass wool insert functions to block, or filter solid polymers from the solution so that the liquid phase, i.e., the monomer, solvent, etc., pass into the column. By using 3% ethyl methacrylate as the internal standard calibration, both of the residual monomers could accurately be determined by this method.

Table V presents the results of residual monomer measurements for Examples 1–5, previously described. These data indicate that the Examples 1–5 copolymers of the present invention have been forced to an extremely high conversion. The low percent of residual monomers typically do not have any significant influence on final physical properties in regard to the end use of the acrylic polymer. The residual monomers in Examples 1–5 are shown in Table V below.

TABLE V

Residual Monomers of Examples 1-5 After High Conversion Polymerization

| Example | Residual MI (%) | Residual MMA (%) | Total Residual Monomer (%) |
|---|---|---|---|
| 1 | 0.15 | 0.60 | 0.75 |
| 2 | 0.42 | 0.57 | 0.99 |
| 3 | 0.79 | 0.53 | 1.21 |
| 4 | 1.03 | 0.49 | 1.52 |
| 5 | 1.48 | 0.42 | 1.90 |

2. Molecular Weights and Polydispersity

In the bulk polymerization process of the present invention the molecular weights of the copolymers can also be controlled or adjusted by the amount of chain transfer agents used. The chain transfer constant of each chain transfer agent, e.g., mercaptan, is a parameter to be considered when adjusting molecular weights of the final product and the determination of how much mercaptan to be used is in accordance with known principles.

The molecular weights of Examples 1-5 were determined through the gel permeation chromatography (GPC) and the results are set forth on Table VI. These data indicate that the molecular weights of all of Examples 1-5 are relatively close to each other. Table VI also presents the polydispersities of Examples 1-5 copolymers. Polydispersity refers to the ratio of Mw to Mn, i.e., how broad is the molecular weight distribution. For purposes of this invention Mw is defined as the weight average molecular weight and Mn is the number average molecular weight.

TABLE VI

Molecular Weights and Polydispersities of Examples 1-5

| Example | Mw | Mn | Polydispersity |
|---|---|---|---|
| 1 | 101,000 | 56,000 | 1.8 |
| 2 | 103,000 | 57,000 | 1.8 |
| 3 | 103,000 | 54,000 | 1.9 |
| 4 | 104,000 | 55,000 | 1.9 |
| 5 | 107,000 | 53,000 | 2.0 |

The operating conditions of the gel permeation chromatography unit are shown in Table VII. All of the measurements for molecular weight were carried out at 23° C.; the polymer concentration was 0.005 g/ml and Perkin-Elmer software (GPC-5) was used for the calculation and data analysis. The universal calibration was based on polystyrene standards. The Table VII data is shown below.

TABLE VII

Operating Conditions for GPC Measurements

A. Apparatus
1. Perkin-Elmer series 10 LC pump
2. Perkin-Elmer LC-25 RI detector
3. Perkin-Elmer 3600 microcomputer
4. Perkin-Elmer Chromatographic Interface
5. Perkin-Elmer CHROM-2 software
6. Perkin-Elmer GPC-5 software B. Testing Conditions
1. Sample concentration - 0.005 g/ml
2. Solvent - THF
3. Temperature: 23° C.
4. Column combination: PL $10^6$ Å × 1, $10^5$ Å × 1, $10^4$ Å × 1, $10^3$ Å × 1 and $10^2$ Å × 1
5. Flow rate - 1.0 ml/min
6. RI detector sensitivity - X10
7. Injection volume - 80 μl

3. Monomer Composition

In order to confirm that the Examples 1-5 copolymers made by the extremely high conversion polymerization process of the present invention have the same ratio of monomers as the ratio in the initial ingredient monomer mixture, a proton-NMR technique was used to determine the monomer composition, or comonomer ratio. In the proton-NMR spectra of MMA/MI copolymer the peak due to the —OCH$_3$ protons of MMA was resolved from that due to the —NH proton of MI. The monomer compositions of the copolymers were calculated from the ratios of the areas under those peaks. The integral curves were measured and the areas were taken to be proportional to the number of protons contributing to the peak. Thus, the integral curve of —OCH$_3$ is proportional to 3 times the number of protons of MMA monomer in the chain and the integral curve associated with the —NH proton is proportional to the number of protons of MI monomer in the chain. By defining R as the molar ratio of MMA divided by MI in the copolymer, then R equals the integral curve area associated with the —OCH$_3$ divided by three times the integral curve area associated with the —NH protons.

These ratios were empirically obtained by averaging three determinations of the appropriate integral curves and then using the above relationship to provide the R values for the Example 1-5 copolymer composition as described above. Table VIII presents these R values.

TABLE VIII

Monomer Composition Determined by $^1$H-NMR Method

| Example | MMA/MI (before polymerization) | R (after polymerization) |
|---|---|---|
| 1 | 49.0 | 48.9 ± 0.3 |
| 2 | 24.0 | 24.1 ± 0.2 |
| 3 | 15.7 | 15.7 ± 0.4 |
| 4 | 11.5 | 11.4 ± 0.3 |
| 5 | 9.0 | 8.8 ± 0.4 |

Proton-NMR spectra were obtained from a Bruker WM-500 spectrometer equipped with a 32-FT-100 pulse NMR computer system. The instrument conditions used in obtaining the data were: 500 MHZ spectrum width, 10 second acquisition time, 10 second delay time between pulse sequences, 20 microsecond pulse widths, and a 45° flip angle. All samples were dissolved in CDCl$_3$ to give a concentration of 0.032 g/ml and then analyzed in 10 mm ID sample tubes.

4. Glass Transition Temperature Measurements

The glass transition temperatures of Examples 1-5 were measured by a differential scanning calorimeter and are shown below in Table IX.

TABLE IX

| Example | Glass Transition Temperature $T_g$(°C.) |
|---|---|
| 1 | 112 |
| 2 | 115 |
| 3 | 119 |
| 4 | 125 |
| 5 | 131 |

The glass transition temperature of all of the Examples 1-5 polymers were determined using a Perkin-Elmer DSC-4 system equipped with a microprocesser, interface and TADS software. Each sample weight was about 30 mg and a 5° C./min heating rate and a 10 psi helium gas environment were used.

In regard to Table IX it is known that pure MMA has a glass transition temperature of about 105°-110° C., which is significantly lower than the glass transition temperatures of the copolymers of the present invention. Also, a different product which has been recently advertised but not commercially available, known as Kamax ™ made by Rohm & Haas Company, has a stated glass transition temperature of 143°-160° C.

Also, it is known that polycarbonates have relatively high glass transition temperatures; however, their cost is relatively high and their weatherability is relatively poor in comparison to both conventional acrylic polymers and to the acrylic copolymers of the present invention.

EXAMPLE 6

Another copolymer of the present invention, Example 6 was prepared in sufficient quantity to be tested for various physical properties.

The Example 6 copolymer was made from the following ingredient mixture:

| Ingredient | Amount (gram) (ml) |
|---|---|
| MMA | 1260 g |
| N-methylmaleimide | 140 g |
| Lauryl peroxide | 1.12 g |
| 2,5-dimethyl-2,5-di-(t-butylperoxy) hexane | 1.575 g |
| n-dodecyl mercaptan | 4.634 g |
| Tinuvin-P ™ from Ciba-Geigy | 0.56 g |
| Stearyl alcohol internal lubricant | 5.95 g |
| Indigo toner | 0.455 ml |

The ingredient mixture was prepared as described above and with a temperature-time sequence as follows:

| Temperature | Time |
|---|---|
| 63° C. | To the 8th hour |
| 75° C. | 3 hours |
| 115° C. | 4 hours |
| 135° C. | 6 hours |

The Tinuvin-P ™ was added to improve UV protection because it is a known UV radiation absorber. Also, Indigo toner is a known blue toner added to modify the color characteristics of the finished product.

A number of samples of the Example 6 copolymer were made and tested in accordance with test method ASTM D-638 at 0.20 inches/minute and at room temperature. The following Table X presents the test data on maximum load, tensile strength, modulus and elongation.

All samples were 0.502 inches in width. Samples 1 and 4 were 0.127 inches in length whereas samples 2, 3 and 5 were 0.128 inches in length.

TABLE X

| | | Example 6 | | |
|---|---|---|---|---|
| Sample No. | Maximum Load (Lbs.) | Tensile Strength (Psi) | Modulus PSI × E5 | Elongation Percent |
| 1 | 505 | 7,920 | 5.23 | 1.8 |
| 2 | 343 | 5,340 | 5.22 | 1.2 |
| 3 | 448 | 6,970 | 4.63 | 1.7 |
| 4 | 581 | 9,110 | 4.72 | 2.6 |
|   | 484 | 7,530 | 4.77 | 1.8 |
| Average: |   | 7,370 | 4.91 | 1.8 |

Similarly, flexural strength and modulus of the Example 6 copolymer were determined in accordance with ASTM D-790-84a, at 0.2 inches/minute, with a span length of 2.00 inches and at room temperature. The results are set forth in Table XI. For this test the sample lengths were 0.131 inch for sample 1, 0.132 inch for sample 2 and 0.132 inch for sample 3. All three samples were 0.500 inches in width.

TABLE XI

| Sample No. | Maximum Load Pounds | Type of Failure | Flexural Strength PSI | Modulus PSI × ES |
|---|---|---|---|---|
| 1 | 37.1 | 5% strain | 13,000 | 5.58 |
| 2 | 43.9 | 5% strain | 15,100 | 5.61 |
| 3 | 48.7 | 5% strain | 16,800 | 5.54 |
|   |   | Average: | 15,000 | 5.58 |

Two samples of the Example 6 copolymer were also tested for compressive strength and modulus in accordance with ASTM D-648, using a heating rate of $2.0 + 1 - 0.2°$ C., an immersion medium of DC200 silicone oil and a span of 4.0 inches. Sample 1 had a width of 0.499 inch and sample 2 had a width of 0.500 inch. Both samples were 0.131 inches in length. Table XII presents the resulting test data.

TABLE XII

| Sample No. | Calculated Applied Load Grams | Actual Applied Load Grams | Fiber Stress PSI | Deflection Temp Degree F. |
|---|---|---|---|---|
| 1 | 1.435 | 651 | 461 | 244 |
| 2 | 1.441 | 654 | 464 | 246 |
|   |   |   | Average: | 245 |

Three additional copolymers prepared in accordance with the present invention have employed N-phenylmaleimide (Example 7), N-methylmaleimide (Example 8) and N-ethylmaleimide (Example 9) as the group II monomer. The ingredients for these three examples are set forth below in Table XIII.

TABLE XIII

| Example No. | MMA Weight | Group II Maleimide Weight (grams) |
|---|---|---|
| 7 | 90 g | 10 g N-phenymaleimide |
| 8 | 90 g | 10 g N-methylmaleimide |
| 9 | 90 g | 10 g N-ethylmaleimide |

Each of the Examples 7-9 ingredient mix also contained 0.06 g lauryl peroxide, 0.33 g 2,5-dimethyl-2,5-di(t-butylperoxy)hexane, 0.331 g n-dodecyl mercaptan, 0.027 g Tinuvin-P ™, 0.417 g stearyl alcohol, and 0.013 g indigo toner. The Examples 8-9 finished polymers were clear and the Example 7 polymer was yellow. All three of the Examples 7-9 copolymers were prepared with a temperature-time polymerization sequence of:

63° C. to the 8th hour, then
55° C. to the 13th hour, then
75° C. for the 3 hours, then
115° C. for 2 hours, and then
135° C. for 4 hours.

The Example 7 copolymer had a Tg of 121° C., the Example 7 copolymer had a Tg of 121° C. and the Example 8 copolymer had a Tg of 122° C.

EXAMPLES 10-14

Several additional example copolymers were prepared using N-cyclohexylmaleimide as the group II maleimide. The ingredient mixtures, polymerization cycles and relevant physical data are set forth below.

| Ingredient | Example 10 Amount (grams) (ml) | |
|---|---|---|
| MMA | 300 g | 75% |
| N-cyclohexylmaleimide | 100 g | 25% |
| Lauryl peroxide | 0.32 g | |
| 2,5-dimethyl-2,5-di-(t-butylperoxy) hexane | 0.50 g | |
| N-dodecyl mercaptan | 1.2 g | |
| Tinuvin-P ™ | 0.16 g | |
| Stearyl alcohol | 1.70 g | |
| Indigo toner | 0.2 ml | |

The polymerization cycle used was:
63° C. to the 8th hour, then
75° C. for 3 hours, then
115° C. for 4 hours, and then
135° C. for 6 hours.
The measured onset Tg was 132.5° C.

| Ingredient | Example 11 Weight (gram) | |
|---|---|---|
| MMA | 300 g | 75% |
| N-cyclohexylmaleimide | 100 g | 25% |
| Lauryl peroxide | 0.32 g | |
| 2,5-dimethyl-2,5-di-(t-butylperoxy) hexane | 0.45 g | |
| N-dodecyl mercaptan | 1.2 g | |
| Tinuvin-P ™ | 0.16 g | |
| Stearyl alcohol | 1.70 g | |

The polymerization cycle used was:
63° C. to the 8th hour, then
75° C. for 3 hours, then
115° C. for 4 hours, and then
135° C. for 6 hours.
The onset Tg was 132° C. and the mid-point Tg was 135° C. The $M_2=95,834$, $M_n=45,778$ and $P_d=2.093$.

| Ingredient | Example 12 Weight (gram) | |
|---|---|---|
| MMA | 320 g | 80% |
| N-cyclohexylmaleimide | 80 g | 20% |
| Lauryl peroxide | 0.32 g | |
| 2,5-dimethyl-2,5-di-(t-butylperoxy) hexane | 0.45 g | |
| N-dodecyl mercaptan | 1.324 g | |
| Tinuvin-P ™ | 0.16 g | |
| Stearyl alcohol | 1.70 g | |

The measured onset TG=120.6° C.

| Ingredient | Example 13 Weight (gram) | |
|---|---|---|
| MMA | 340 g | 85% |
| N-cyclohexylmaleimide | 60 g | 15% |
| Lauryl peroxide | 0.32 g | |
| 2,5-dimethyl-2,5-di-(t-butylperoxy) hexane | 0.45 g | |
| N-dodecyl mercaptan | 1.324 g | |
| Tinuvin-P ™ | 0.16 g | |
| Stearyl alcohol | 1.70 g | |

The measured onset Tg=124.7° C.
The polymerization cycle used for both Examples 12 and 13 was:
63° C. to the 8th hour, then
75° C. for 3 hours, then
115° C. for 4 hours, and then
125° C. for 4 hours.

| Ingredient | Example 14 Weight (gram) | |
|---|---|---|
| MMA | 360 g | 90% |
| N-cyclohexylmaleimide | 40 g | 10% |
| Lauryl peroxide | 0.32 g | |
| 2,5-dimethyl-2,5-di-(t-butylperoxy) hexane | 0.45 g | |
| N-dodecyl mercaptan | 1.324 g | |
| Tinuvin-P ™ | 0.16 g | |
| Stearyl alcohol | 1.70 g | |

The polymerization cycle used was:
63° C. to the 8th hour, then
75° C. for 3 hours, then
115° C. for 4 hours, and then
135° C. for 6 hours.
The measured onset Tg=122.95° C. and the sample was slightly yellow.

From the Examples 10-14 data it appears that the Example 10 formulation is preferable, in light of the relatively high Tg. It is also noted that although MMA/MI is the preferred copolymer, in terms of clarity, the lack of availability of MI in commercially competitive quantities and prices at present will limit its commercial uses. On the other hand, N-cyclohexylmaleimide is available at commercially useful prices and quantities and is thus an acceptable compound of the present invention, even though it lacks the clarity of the preferred maleimide copolymer.

EXAMPLES 15-17

Three additional laboratory scale samples of copolymers of the present invention were prepared to illustrate Group I, II, III and Group II, III copolymers as referred to previously. These three copolymers were made from ingredient mixtures as follows:

| Ingredient | Amount (grams) (ml) |
|---|---|
| Example 15 | |
| MMA | 288 g |
| Ethyl acrylate | 12 g |
| N-cyclohexylmaleimide | 100 g |
| Lauryl peroxide | 0.32 g |
| 2,5-dimethyl-2,5-di-(t-butylperoxy) hexane | 0.45 g |
| N-dodecyl mercaptan | 1.2 g |
| Tinuvin-P ™ from Ciba-Geigy | 0.16 g |
| Stearyl alcohol internal lubricant | 1.70 g |
| Indigo toner | 0.3 ml |
| Example 16 | |
| Ethyl acrylate | 150 g |
| N-cyclohexylmaleimide | 20 g |
| Lauryl peroxide | 0.14 g |
| 2,5-dimethyl-2,5-di-(t-butylperoxy) hexane | 0.18 g |
| N-dodecyl mercaptan | 0.48 g |
| Indigo toner | 0.12 ml |
| Example 17 | |
| MMA | 130 g |
| Ethyl acrylate | 5 g |
| Maleimide | 12 g |
| Lauryl peroxide | 0.12 g |
| 2,5-dimethyl-2,5-di- | 0.16 g |

-continued

| Ingredient | Amount (grams) (ml) |
|---|---|
| (t-butylperoxy) hexane | |
| N-dodecyl mercaptan | 0.45 g |
| Tinubin-P ™ from Ciba-Geigy | 0.06 g |
| Stearyl alcohol internal lubricant | 0.0638 g |

The polymerization cycle for each of Examples 15–17 was as follows: The polymerization cycle used was:

63° C. to the 8th hour, then
55° C. for 3 hours, then
75° C. for 3 hours, then
115° C. for 4 hours, and then
135° C. for 6 hours.

The Example 15 copolymer was yellow and had an onset Tg of 126° C. The Example 16 copolymer was slightly yellow and had a Tg of 129° C. The Example 17 copolymer was clear and had a Tg of 120 ° C.

EXAMPLE 18

A production scale copolymer of the present invention was also made with the following ingredient mixture:

| Ingredient | Amount |
|---|---|
| MMA | 75 lbs. |
| N-cyclohexylmaleimide | 25 lbs. |
| Lauryl peroxide | (0.08 lbs.) |
| 2,5-dimethyl-2,5-di-(t-butylperoxy) hexane | (0.125 lbs.) |
| N-dodecyl mercaptan | 0.3 lbs. |
| Tinuvin-P ™ from Ciba-Geigy | 0.04 lbs. |
| Stearyl alcohol | 0.425 lbs. |
| Indigo toner | 15 ml |

The copolymer was yellow and had an onset Tg of 130° C., witn a midpoint Tg of 135° C. The $M_n$ was 45,000, the $M_w$ was 95,000 and the $P_d$ was 2.1. The copolymer had a specific gravity of 1.194.

It is believed that the high conversion free radical bulk polymerization of methacrylates, acrylates and maleimides of the present invention can provide a new generation of acrylic plastics to obtain a superior, clear, high temperature heat resistant acrylic copolymers.

Because the copolymers of the present invention are prepared by a bulk polymerization process as described, they do not contain residual emulsifiers, solvents or dispersion agents as would copolymers produced by other polymerization techniques. These impurities operate to lower Tg's and to degrade the clarity of the resulting copolymers. Thus, the copolymers of the present invention are substantially emulsifer free, solvent free and dispersion agent free. They also exhibit extremely good clarity, absences of particulate and have higher Tg's than identical copolymers produced by other methods. Also the bulk polymerization process of the present invention is generally less costly than conventional extrusion technology.

The above-described preferred embodiments and samples are provided by way of illustration only and are not intended to limit the invention to only those samples as specifically set forth above. Rather, it is anticipated that numerous alternative formulations of methacrylate/acrylate/maleimide compositions may be formulated within the principles of the present invention and numerous equivalent compositions may be formulated within the scope of the present invention, which is defined according to the claims appended hereto.

I claim:

1. A method of making a bulk methacrylate-maleimide copolymer comprising the steps of:

selecting a first monomer from the group methyl methacrylate, ethyl methacrylate, ethyl acrylate, butyl acrylate and propyl acrylate;

selecting a second monomer from the group maleimide, N-methylmaleimide, N-ethylmaleimide, N-phenylmaleimide and N-cyclohexylmaleimide;

selecting a low temperature initiator having a half life of about ten hours at about 50–70° C.;

selecting a high temperature initiator having a half life of about ten hours at about 90–130° C.;

selecting a chain transfer agent means for controlling chain lengths of copolymers to be formed from said first and second monomer;

thoroughly mixing the first monomer, second monomer, low temperature initiator, high temperature initiator and chain transfer agent means in a container to form a mixture;

purging the mixture with a relatively non-reactive gas to form a purged mixture;

passing the purged mixture through a filter to form a filtered mixture;

placing a predetermined quantity of the filtered mixture into a cell to form a mixture bulk;

placing the mixture bulk into a reaction chamber;

heating the reaction chamber to a first temperature of about 55°–70° C. and maintaining the first temperature for about 5–10 hours;

establishing in the reaction chamber a second temperature of about 40°–55° C. and maintaining the second temperature for about 5–10 hours;

establishing in the reaction chamber a third temperature of about 70°–85° C. and maintaining the third temperature for about 5–10 hours;

establishing in the reaction chamber a fourth temperature of about 100°–120° C. and maintaining the fourth temperature for at least 3 hours; and establishing in the reaction chamber a fifth temperature of about 120°–250° C. and maintaining the fifth temperature for at least 3 hours to form a bulk copolymer.

2. The method of claim 1 further comprising the steps of:

selecting a third monomer from the group ethyl acrylate, butyl acrylate and propyl acrylate prior to mixing and including the third monomer in the mixing step.

3. The method of either claim 1 or 2 wherein the first monomer is methyl methacrylate and the second monomer is maleimide.

* * * * *